US007243599B2

United States Patent
Yoo et al.

(10) Patent No.: US 7,243,599 B2
(45) Date of Patent: Jul. 17, 2007

(54) METHOD OF FABRICATING COLOR FILTER IN DISPLAY DEVICE

(75) Inventors: Hong-Suk Yoo, Gyeonggi-Do (KR); Myoung-Kee Baek, Gyeonggi-Do (KR)

(73) Assignee: LG Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/679,060

(22) Filed: Oct. 3, 2003

(65) Prior Publication Data

US 2004/0123753 A1 Jul. 1, 2004

(30) Foreign Application Priority Data

Dec. 27, 2002 (KR) ............... 10-2002-0085631

(51) Int. Cl.
*B41M 1/10* (2006.01)
(52) U.S. Cl. ............... 101/170; 101/158; 430/7
(58) Field of Classification Search ............... 101/41, 101/154, 158, 155, 157, 163, 170, 215, 58; 351/135; 430/7
See application file for complete search history.

(56) References Cited

U.S. PATENT DOCUMENTS

| | | | |
|---|---|---|---|
| 4,294,650 A | | 10/1981 | Werthmann |
| 4,841,857 A | * | 6/1989 | Hashimura et al. ......... 101/158 |
| 5,017,223 A | * | 5/1991 | Kobayashi et al. ...... 106/31.13 |
| 5,259,926 A | | 11/1993 | Kuwabara et al. |
| 5,335,595 A | * | 8/1994 | Yamashita et al. .......... 101/158 |
| 5,366,760 A | * | 11/1994 | Fujii et al. .................. 427/98.4 |
| 5,514,503 A | | 5/1996 | Evans et al. |
| 5,544,582 A | | 8/1996 | Bocko et al. |
| 5,678,483 A | | 10/1997 | Johnson |
| 5,701,815 A | | 12/1997 | Bocko et al. |
| 5,824,374 A | * | 10/1998 | Bradley et al. ............. 427/555 |
| 5,925,484 A | * | 7/1999 | Shima et al. .................. 430/7 |
| 6,001,515 A | | 12/1999 | Evans et al. |
| 6,356,318 B1 | | 3/2002 | Kawahata |
| 6,488,376 B1 | * | 12/2002 | Streibig ..................... 351/162 |
| 2003/0063238 A1 | * | 4/2003 | Yi et al. ..................... 349/106 |

FOREIGN PATENT DOCUMENTS

| | | |
|---|---|---|
| EP | 0 471 628 A1 | 3/1991 |
| EP | 0471628 | * 3/1991 |
| JP | 63-205608 | 8/1988 |
| JP | 03-280416 | 12/1991 |
| JP | 04-094115 | 3/1992 |
| JP | 04-239684 | 8/1992 |
| JP | 04-249189 | 9/1992 |

(Continued)

*Primary Examiner*—Daniel J. Colilla
*Assistant Examiner*—Marissa Ferguson-Samreth
(74) *Attorney, Agent, or Firm*—Brinks Hofer Gilson & Lione

(57) ABSTRACT

A method of fabricating a color filter in a liquid crystal display device includes providing a plurality of clichés in which grooves are formed, filling color inks and a black resin in the grooves of the clichés, applying the color inks in the clichés onto a substrate to form a color filter, and applying a black resin in one of the clichés onto the color filter. The color inks and black resin are transferred to the clichés from an ink supply container via an ink supplying roller and from the clichés to the substrate via a printing roller.

28 Claims, 6 Drawing Sheets

FOREIGN PATENT DOCUMENTS

| | | |
|---|---|---|
| JP | 04-296724 | 10/1992 |
| JP | 05-011270 | 1/1993 |
| JP | 06-202314 | 7/1994 |
| JP | 07-240523 | 9/1995 |
| JP | 2001183647 * | 6/2001 |

* cited by examiner

METHOD OF FABRICATING COLOR FILTER IN DISPLAY DEVICE

This application claims the benefit of priority to Korean Patent Application No. P2002-85631, filed on Dec. 27, 2002.

BACKGROUND OF THE INVENTION

1. Field of the Invention

The present invention relates to a display device, and particularly, to a simplified method of fabrication a color filter in a liquid crystal display device having a reduced fabrication cost.

2. Description of the Related Art

The ongoing development of various portable electric devices such as mobile phones, PDAs, notebook computers, etc. requires concomitant development of thin and small flat panel display devices. Liquid crystal displays (LCD), plasma display panels (PDP), field emission displays (FED), and vacuum fluorescent displays (VFD), for example have all been actively researched for use as the flat panel display, however, the LCD is generally used due to its advanced mass production technology, the easy of driving the devices, and realization of high image quality.

FIG. 1 is a view showing a cross-section of a general liquid crystal display device. As shown therein, the liquid crystal display device 1 comprises a first substrate 5, a second substrate 3, and a liquid crystal layer 7 formed between the first substrate 5 and the second substrate 3. The first substrate 5 is a driving device array substrate, and a plurality of pixels are formed on the first substrate 5 and a driving device 9 such as a thin film transistor is formed on the respective pixel. The second substrate 3 is a color filter substrate, and a color filter layer 2 for realizing actual colors and a black matrix 8 for blocking light leakage are formed thereon. Also, a pixel electrode 6 and a common electrode 4 are formed on the first substrate 5 and the second substrate 3 respectively, and an alignment layer (not shown) for orienting liquid crystal molecules of the liquid crystal layer 7 is applied thereon.

The liquid crystal display device constructed as above is formed by a driving device array substrate process and a color filter substrate process respectively.

The driving device array substrate process forms a plurality of gate lines and data line arranged on the lower substrate 5 for defining pixel areas, forms the thin film transistor 9, that is, the driving device connected to the gate line and to the data line on respective pixel area, and after that, forms a pixel electrode connected to the thin film transistor 9 for driving the liquid crystal layer according to a signal application through the thin film transistor.

Also, the color filter process forms the black matrix on the upper substrate 3, forms the color filter 2 on upper part of the black matrix 8, and forms the common electrode 4 on the color filter 2.

Different methods exist for fabricating the color filter, such as a pigment dispersing method and an electrophoresis deposition method. The pigment dispersing method forms the color filter by coating, exposing, developing and burning pigment composition dispersed on a photoresist. Fabrication of the color filter using the pigment dispersing method will be described with reference to FIGS. 2A to 2D.

First, as shown in FIG. 2A, a transparent substrate 21 is prepared, material for forming black matrix, such as chrome and organic material, is coated on the substrate 21, and after that, a black matrix pattern 22 is formed using a photolithographic process that includes a photo mask. As shown in FIG. 2B, materials for forming red (R) color filter layer 23 are coated on the substrate 21 and black matrix pattern 22. A predetermined area is the exposed using a photo mask 28 and developed to form the R color filter layer 23a as shown in FIG. 2C. After that, the above process is repeated using different materials to form the green (G) and blue (B) color filters layers 23b and 23c, as shown in FIG. 2d.

However, in the fabrication method used to form the color filters according to the related art, not only are expensive photo masks used, but in addition, the photolithographic processes, which include the color filter coating, exposure, and development, are repeatedly performed to create the color filter. The expense of the photo masks as well as the time and costs associated with multiple fabrication steps increase the overall fabrication costs in forming the layer containing the color filters.

SUMMARY OF THE INVENTION

Therefore, one embodiment of the present invention provides a fabrication method of providing a color filter for a display device which is able to reduce processing time and to reduce fabrication cost.

To achieve one embodiment of the present invention, as embodied and broadly described herein, a fabrication method is provided for forming a color filter. The method includes providing a plurality of clichés in which grooves are formed, each groove having one of a color ink and opaque material (which may be a black resin), transferring the color inks in the clichés onto a substrate to form a color filter, and transferring the opaque material in a first cliché onto the color filter. Red ink, green ink, and blue ink may be selected as the color inks.

The method may comprise supplying the color inks to the grooves. Supplying the color inks to the grooves may comprise providing a supplying container with at least one of the color inks, imparting the at least one of the color inks to an ink supplying roller from the supplying container, contacting the clichés with the ink supplying roller, and rolling the ink supplying roller on the clichés to apply the at least one of the color inks to the clichés. In this case, the method may further comprise providing a plurality of ink supplying rollers, and imparting only one of the color inks to each ink supplying roller. In this case, the method may further comprise rolling each ink supplying roller on only one of the clichés.

Transferring the color inks may comprise transferring the color inks in the grooves of the clichés onto a surface of a printing roller (which itself may comprise rolling the printing roller on the clichés) and transferring the color inks on the printing roller to the substrate (which itself may comprise rolling the printing roller containing the color inks on the substrate). Transferring the color inks may comprise may comprise transferring each of the color inks from the groove of each cliché onto a surface of a printing roller, each cliché containing only one of the color inks and transferring the color inks to the substrate, the printing roller containing only a single color ink each time the printing roller is rolled on the substrate. Transferring each of the color inks from the groove of each cliché onto a surface of a printing roller may comprise rolling the printing roller on the clichés while transferring the color inks on the printing roller to the substrate may comprise rolling the printing roller containing the color inks on the substrate.

The color filter may be hardened after forming the color filter on the substrate. UV radiation and/or heat may be applied to the color filter to harden the color filter.

Transferring the opaque material may comprise supplying the groove of the first cliché with the opaque material, transferring the opaque material to a surface of a printing roller (which may comprise rolling the printing roller on the first cliché), and transferring the opaque material to a boundary area between the color inks forming the color filter (which may comprise rolling the printing roller containing the opaque material on the substrate on which the color filter is formed). UV radiation and/or heat may be applied to the opaque material to harden the opaque material.

The method may also comprise removing excess color inks and/or opaque material from the grooves in the clichés prior to transferring the color inks in the clichés onto the substrate. In this case, the method may further comprise removing the excess color inks and/or opaque material by moving a blade along the clichés such that the grooves are substantially filled by the color inks and/or opaque material, the filled grooves are substantially planar with the remainder of the clichés, and the color inks and/or opaque material on the surface of the clichés not in the grooves are removed.

The method may further comprise transferring all of the color inks to the substrate on a single transfer apparatus, and may further comprise disposing all of the color inks on the single transfer apparatus at the same time (i.e. rather than repeatedly disposing one or more of the color inks to the transfer apparatus).

The method may further comprise removing color ink present on a transfer apparatus that transfers the color inks in the clichés onto the substrate (which may be the printing roller) from the transfer apparatus prior to a new color ink being transferred to the transfer apparatus.

In another embodiment, the method of fabricating a color filter in a display device comprises providing a plurality of clichés in which grooves are formed, supplying the clichés with color inks, rolling a first printing roller on a first cliché to transfer a first color ink in a groove of the first cliché onto a surface of the first printing roller, rolling the first printing roller on which the first color ink is transferred on a second cliché to transfer a second color ink in a groove of the second cliché onto the surface of the first printing roller, rolling the first printing roller on which the first and second color inks are transferred on a third cliché to transfer a third color ink in a groove of the third cliché onto the surface of the first printing roller, rolling the first printing roller on which the first, second, and third color inks are transferred on a substrate to apply the first, second, and third color inks to the substrate and form a color filter, supplying a opaque material in a groove of a fourth cliché, rolling a second printing roller on the fourth cliché to transfer the opaque material in the groove of the fourth cliché onto a surface of the second printing roller, and rolling the second printing roller containing the opaque material on the color filter to apply the opaque material transferred to the surface of the second printing roller onto boundary areas between the color inks forming the color filter.

In another embodiment, a method of fabricating a color filter in a display device comprises supplying grooves of a plurality of clichés with color inks, rolling the first printing roller on a first cliché to transfer a first color ink in a groove of the first cliché to a surface of the first printing roller, rolling the first printing roller containing the first color ink on a substrate to apply the first color ink to the substrate, rolling the first printing roller on a second cliché to transfer a second color ink in a groove of the second cliché to the surface of the first printing roller, rolling the first printing roller containing the second color ink on the substrate containing the first color ink to apply the second color ink to the substrate, rolling the first printing roller on a third cliché to transfer a third color ink in a groove of the third cliché to the surface of the first printing roller, rolling the first printing roller containing the third color ink on the substrate containing the first and second color inks to apply the third color ink to the substrate, supplying a groove of a fourth cliché with opaque material and rolling a second printing roller on the fourth cliché to transfer the opaque material in the groove of the fourth cliché to a surface of the second printing roller, and rolling the second printing roller containing the opaque material on the substrate to apply the opaque material transferred on the surface of the second printing roller to a boundary area between the first, second, and third colors on the substrate.

The method may further comprise removing color ink present on the first printing roller from the first printing roller before a new color ink is transferred to the first printing roller.

The foregoing and other features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENTS

Reference will now be made in detail to the embodiments of the present invention, examples of which are illustrated in the accompanying drawings.

Figure 1:
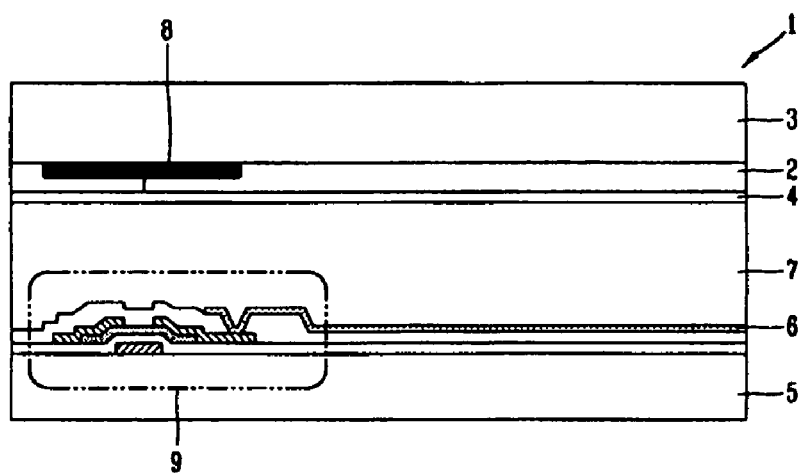
FIG. 1 is a cross-sectional view showing a liquid crystal display (LCD) device of the related art.
Figure 2A:
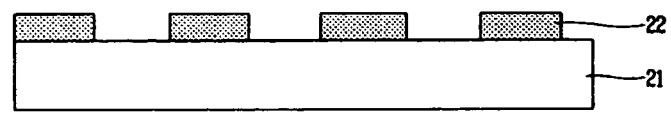
FIGS. 2A, 2B, 2C, and 2D are views illustrating a fabrication method of a color filter substrate in a liquid crystal display device according to the related art.
Figure 2B:
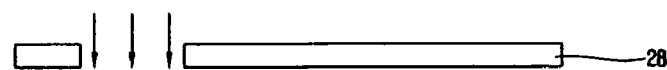
Figure 2C:
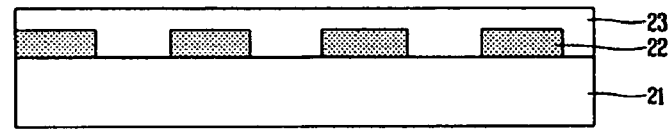
Figure 2D:
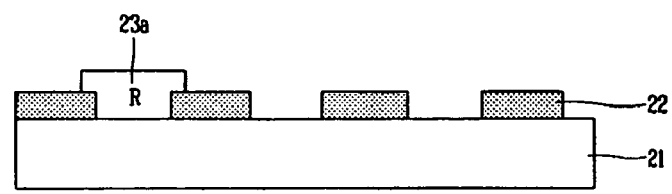
Figure 3A:
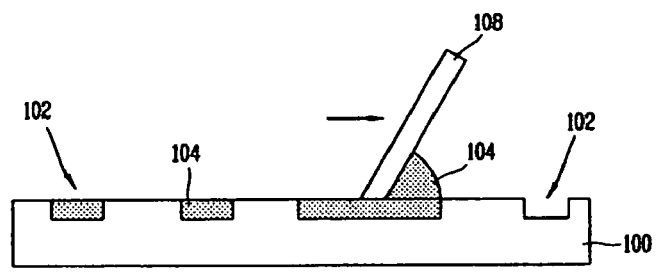
FIGS. 3A, 3B, and 3C are views showing a pattern forming method according to a gravure offset printing method.
Figure 3B:
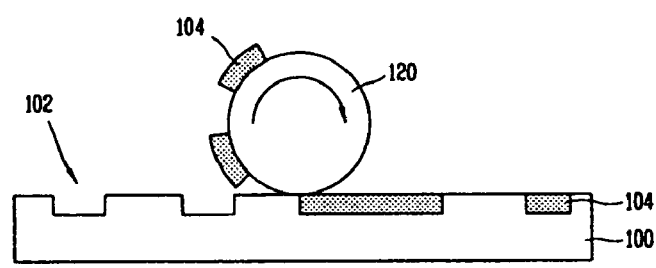
Figure 3C:
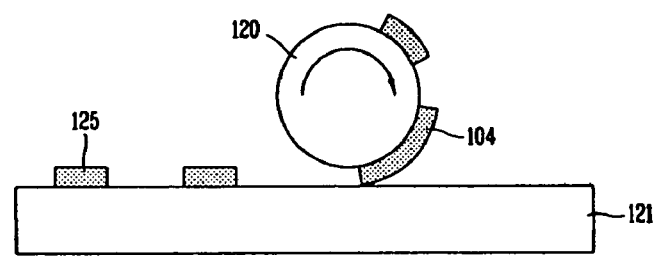

FIGS. 3A, 3B, and 3C are views illustrating a pattern forming method according to a printing method, in particular, according to a gravure offset printing method.

First, as shown in FIG. 3A, a groove 102 is formed at one or more positions on a concave plate or cliché 100 corresponding to a pattern which will be formed on a substrate, and ink 104 is filled in the groove 102. The filling of the ink 104 into the groove 102 of the cliché 100 is performed by applying ink 104 to the cliché 100 and the removing a portion of the ink 104 by scraping off the excess/unwanted ink with a blade 108 that contacts the substrate 100. More specifically, excess ink 104 that is filled in the groove 102 and ink 104 remaining on the surface of the cliché 100 outside of the grooves 102 is removed by moving the blade 108 along the cliché 100, perhaps at a constant speed and in one direction for uniformity and ease of removal. An ink recycler or removal system (not shown) may be provided to eliminate the excess ink removed from the cliché 100 and/or the excess ink that has built up on the blade 108. The mechanical aspects associated with removal of the excess ink, such as the angle between the blade 108 and the cliché 100, the type, size and sharpness of the blade 108, pressure between the blade 108 and cliché 100, or the speed of movement of the blade 108, can be set to any value desired so long as the excess ink is removed from the groove 102 and surface of the cliché 100 without damaging the cliché 100 and substantially all of the excess ink is removed.

In addition, as shown in FIG. 3B, the ink 104 in the groove 102 of the cliché 100 is transferred onto a surface of a printing roller 120 which is rotated as it contacts the surface of the cliché 100 (i.e. as the printing roller 120 or transfer apparatus rolls on the surface of the cliché 100). The printing roller 120 may have substantially the same width as that of the substrate to be fabricated and has substantially the same circumference as the length of the cliché 100. This permits the ink 104 filled in the groove 102 of the cliché 100 to be transferred onto the surface of the printing roller 120 with a single revolution of the printing roller 120.

After that, as shown in FIG. 3C, the ink 104 transferred to the printing roller 120 is applied to the substrate 121. To transfer the ink to the substrate 121, the printing roller 120 rolls along the surface of the substrate 121. The printing roller 120 again may have substantially the same circumference as the length of the substrate 121, which permits the ink on the printing roller 120 to be transferred to the substrate 121 with a single revolution of the printing roller 120. After the ink 104 has been transferred to the substrate 121, ultraviolet radiation (UV) or heat is used to harden the ink 104, thereby forming an ink pattern 125. Thus, a color filter can be formed on entire substrate 121 in a single rotation of the printing roller 120.

When the ink pattern 125 is formed using the above printing method, the desired pattern can be formed without using photolithographic processes, and therefore, the photo mask process of the related art including mask creation, application of photoresist, mask alignment, and exposure and development of the photoresist, can be omitted, reducing the fabrication time and cost.

Figure 4:
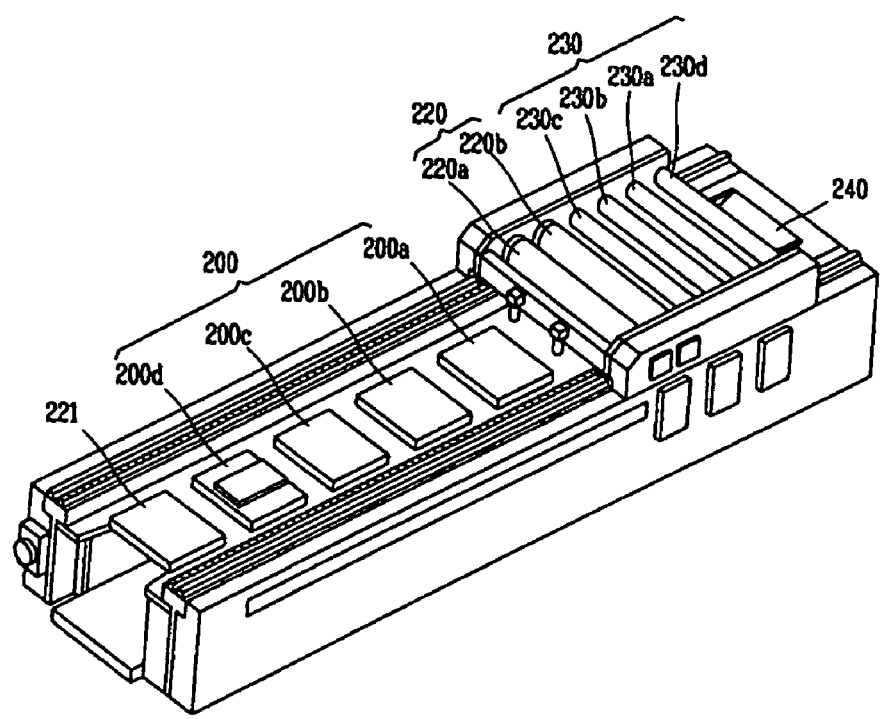
FIG. 4 is a view showing a gravure offset printing apparatus.

FIG. 4 and FIGS. 5A to 5D are views illustrating a fabrication method of the color filter for the display device according to the present invention. FIG. 4 shows a printing apparatus for fabricating the color filter of the present invention. FIGS. 5A to 5D are views illustrating the fabrication method of the color filter using the above printing apparatus. Although this method may be employed during fabrication LCDs, it also may be used for other types of displays that use color filters and that are amenable to a similar type of roller process.

As shown in these figures, the printing apparatus contains a plurality of clichés 200 (200a, 200b, 200c, 200d) for forming red (R), green (G), and blue (B) color filters and a black matrix pattern. Each of the clichés 200 is similar to the cliché 100 of FIGS. 3A to 3C, without the individual features being shown in FIG. 4. The printing apparatus also includes a plurality of printing rollers 220 (220a and 220b) that are used to transfer the red, green, blue color inks and black resin (or opaque material that is opaque to radiation to be applied to the substrate) filled in the cliché 200 onto the substrate 221 as well as a plurality of ink supplying rollers 230 (230a, 230b, 230c, 230d) that supply the red, green, and blue color inks and the black resin to the clichés 200. An ink container 240 provides the ink supplying roller 230 with the particular ink to be applied to one of the clichés 200.

Grooves are formed on the clichés 200 that have the same dimensions as the red, green and blue color filters and the black matrix pattern which are to be formed on the substrate 121. The printing apparatus also includes a blade (not shown) for removing the ink that remains on the surface of each cliché 200 after the ink has been supplied to the cliché 200 as described above.

The fabrication method of the color filter using the above printing apparatus constructed as above will now be described.

First, a particular color ink is filled in the ink supplying container 240. The ink supplying roller 230 is then moved to be in contact with the ink supplying container 240 and rotated to coat the color ink over at least a portion of the surface of the ink supplying roller 230 that is to contact the cliché 200 associated with that color. Then, the ink supplying roller 230 is moved away from the ink supplying container 240 to contact the associated cliché 200 and rotated to apply the color ink to that cliché 200. The ink on the surface of the cliché 200 is subsequently moved using the blade (not shown) such that the groove of the cliché 200 is filled with the ink and planarized while excess ink remaining on the surface of the cliché 200 is removed. Thus, ink is left only in the groove of the cliché 200.

The ink supplying container may then be cleaned and refilled with a different color ink and the process repeated using a different ink supplying roller and cliché until the desired number of clichés are filled. Alternatively, the ink supplying container may have different compartments filled with different color inks, the different ink supplying rollers being moved and supplied with ink one after the other, and then the clichés filled one after the other by the different ink supplying rollers. In either of these embodiments, the different ink supplying rollers are moved such that only the ink supplying roller associated with a particular color contacts (and is supplied with) that particular color ink and contacts (and transfers) that particular color ink only to the associated cliché. In another embodiment, only a single ink supplying roller may be used, which may be cleaned after each transferal of ink to the respective cliché. Also, although multiple clichés are shown in FIG. 4, a single cliché may be used. In an embodiment using but a single cliché, that cliché contains grooves that are adjacent to each other and each groove is filled with a color that is different from the color in the adjacent groove such that the printing roller will pick up the ink from the cliché and transfer the ink to the substrate to form the color filter. For example, the grooves may be filled with ink colors red, green, and blue, in that order, one or multiple times as desired.

As shown, in one embodiment the ink supplying container 240 supplies red color ink to the first ink supplying roller 230a, which then contacts and rotates on the first cliché 200a to apply the red ink to the surface of the first cliché 200a. Similarly, the green color ink and the blue color ink are supplied to the second ink supplying roller 230b and third ink supplying roller 230c, and which apply the green ink and the blue ink to the surfaces of the second and third cliché 200b and 200c, respectively.

Figure 5A:
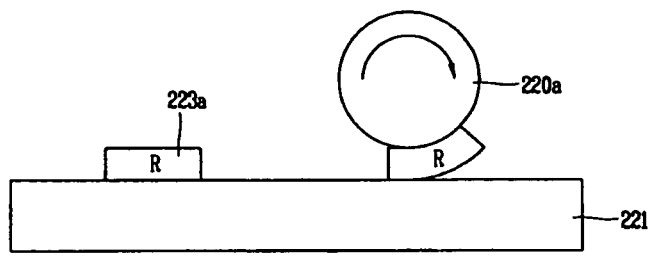
FIGS. 5A, 5B, 5C, and 5D are views illustrating a fabrication method of the color filter in an LCD device according to the present invention.
Figure 5B:
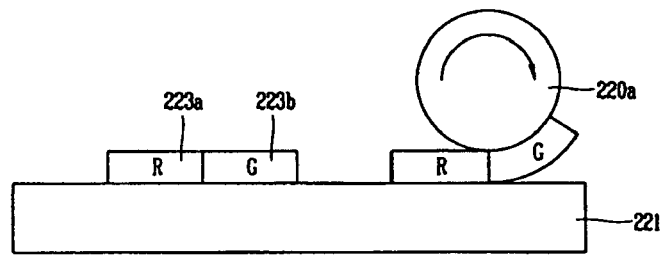
Figure 5C:
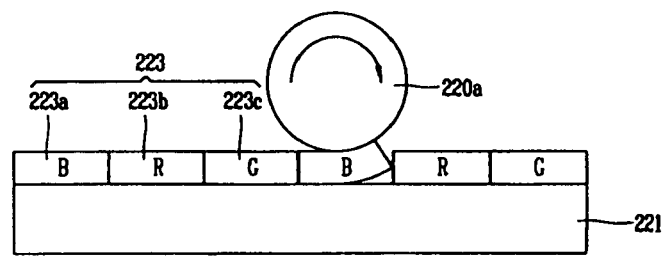

As described above, the red, green and blue color inks are filled in the grooves of the clichés 200 by the ink supplying rollers 230. After that, the first printing roller 220a contacts and rotates on (i.e. rolls along) the surface of the first cliché 200a to transfer the red ink onto the surface of the first printing roller 220a, and the red ink transferred to the first printing roller 220a is then applied to the substrate 221 to form the red color filter 223a, as shown in FIG. 5A. Next as shown in FIG. 5B, the first printing roller 220a contacts and rotates on the surface of the second cliché 220b, thereby transferring the green color ink onto the surface of the first printing roller 220a. The green color ink transferred to the first printing roller 220a is subsequently applied to the substrate 221 on which the red color filter 223a is formed to form the green color filter 223b. After that, as shown in FIG. 5C, the blue color ink is printed on the substrate 221 on which the red and green color filters 223a and 223b are formed by repeating the above process to form the blue color filter 223c. Then, the color filter 223 is hardened by applying UV radiation or heat to the substrate 221 prior to the black resin being formed on the color filter 223 to enable the color filter 223 to withstand the stress of the transfer process.

Figure 5D:
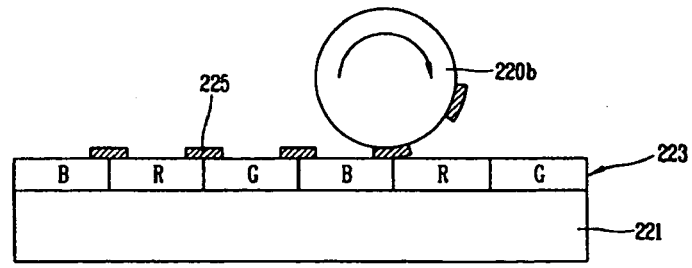

Next, the black resin is supplied to the fourth ink supplying roller 230d, which then contacts and rotates on the fourth cliché 200d, thereby filling the groove of the fourth cliché 200d with the black resin. The black resin may be supplied to the fourth cliché 200d at the same time that the color inks are supplied to the other clichés, or may be supplied after the color inks are transferred to the substrate 221. After the black resin is supplied to the fourth cliché 200d, the second printing roller 220b rolls along the surface of the fourth cliché 200d to transfer the black resin in the groove to the surface of the second printing roller 220b. After that, as shown in FIG. 5D, the black resin transferred to the surface of the second printing roller 220b is transferred to the color filter 223 when the second printing roller 220b rolls along the color filter 223, thereby printing the black resin on a boundary region of the red, green and blue color filter 223. UV radiation or heat is provided to the black resin to form the black matrix 225.

Figure 6:
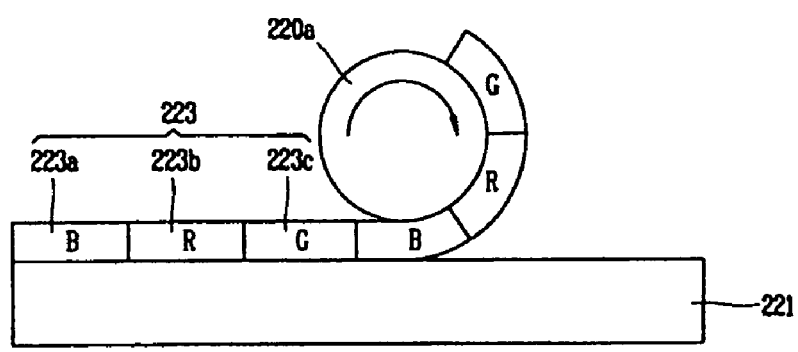
FIG. 6 illustrates a fabrication method of the color filter in an LCD device according to another embodiment of the present invention.

In another embodiment, as shown in FIG. 6, when the color filter is formed, the first printing roller 220a contacts and rotates on the first, second, and third clichés 200a, 200b, and 200c in which the red, green and blue color inks are filled such that the red, green and blue color inks are transferred onto the first printing roller 220a in a contiguous manner. This is to say that the inks are transferred onto the printing roller 220a such that the color inks are all disposed on the printing roller 220a at the same time, rather than only one color at a time being disposed on the printing roller 220a (i.e., all of the color inks are transferred on a single transfer apparatus at the same time). The color inks are then applied to the substrate 221 to form the red, green and blue color filters 223a, 223b, and 223c one after the other so that the overall color filter 223 is formed by the first printing roller 220a in one pass of the substrate 221 (either in a single rotation or multiple revolutions). By forming the red, green, and blue color filters at the same time the fabrication time in producing the color filter can be further reduced.

As above, the characteristics associated with the transferal of the ink to the cliché by the ink supply roller and to the substrate by the printing roller, the type of roller or pressure between the roller and cliché or substrate can be set to any value desired so long as the ink is transferred without damaging the cliché or substrate. The cliché may be formed from a metal or ceramic that is hard enough to withstand the cleaning and transferal processes described above, as well as being relatively easy to clean. Similarly, surface of the roller may be formed from a material that permits the ink or resin to readily adhere to the surface of the roller when the ink or resin is transferred to the roller and permits the ink or resin to be readily removed from the surface of the roller when the ink or resin is transferred to the substrate. The roller material is also formed from a material that is relatively easy to clean while being resilient enough to withstand the cleaning process.

As described above, the present invention provides a method of fabrication for a color filter of a display device. In the related art, the color filter layer is applied, and a photolithographic process repeated to form the red, green and blue color filter pattern. However, according to the present invention, the color filter and the black matrix are formed using a printing method. This eliminates the photolithographic process, thereby reducing fabrication time and cost. In one embodiment, the entire color filter layer is printed at the same time, which further reduces the fabrication time and cost.

While a method of fabrication of a color filter and black matrix by a gravure offset printing method is described in the detailed description of the present invention, the scope of the present invention should not be limited thereto. For example, the color filter and the black matrix can be formed using screen printing, ink jet printing or flexography. That is, one advantage of the present invention is to form the color filter substrate without using a photolithographic process, and other embodiments or modified embodiments using the above concepts should be included in the scope of the present invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of fabricating a color filter in a display device comprising:
    providing a plurality of clichés in which grooves are formed, each groove having one of a color ink and a black resin;
    transferring the color inks in the clichés onto a substrate to form a color filter for a display device; and
    transferring the black resin in a first cliché onto the color filter to form a black matrix pattern on top of the color filter.

2. The method of claim 1, further comprising removing color ink present on a transfer apparatus that transfers the color inks in the clichés onto the substrate from the transfer apparatus prior to a new color ink being transferred to the transfer apparatus.

3. The method of claim 1, wherein transferring the color inks comprises:
    transferring the color inks in the grooves of the clichés onto a surface of a printing roller; and
    transferring the color inks on the printing roller to the substrate.

4. The method of claim 3, wherein transferring the color inks in the grooves of the clichés onto the surface of the printing roller comprises rolling the printing roller on the clichés.

5. The method of claim 3, wherein transferring the color inks on the printing roller to the substrate comprises rolling the printing roller containing the color inks on the substrate.

6. The method of claim 1, wherein transferring the color inks comprises:
   transferring each of the color inks from the groove of each cliché onto a surface of a printing roller, each cliché containing only one of the color inks; and
   transferring the color inks to the substrate, the printing roller containing only a single color ink each time the printing roller is rolled on the substrate.

7. The method of claim 6, wherein transferring each of the color inks from the groove of each cliché onto the surface of a printing roller comprises rolling the printing roller on each cliché.

8. The method of claim 6, wherein transferring the color inks to the substrate comprises rolling the printing roller on the substrate.

9. The method of claim 6, further comprising removing color ink present on the printing roller prior to a new color ink being transferred to the printing roller.

10. The method of claim 1, further comprising hardening the color filter after forming the color filter on the substrate.

11. The method of claim 10, further comprising applying at least one of UV radiation and heat to harden the color filter.

12. The method of claim 1, wherein transferring the black resin comprises:
    supplying the groove of the first cliché with the black resin;
    transferring the black resin to a surface of a printing roller; and
    transferring the black resin to a boundary area on top of the color inks forming the color filter.

13. The method of claim 12, wherein transferring the black resin to the surface of the printing roller comprises rolling the printing roller on the first cliché.

14. The method of claim 12, wherein transferring the black resin to the boundary area between the color inks forming the color filter comprises rolling the printing roller containing the black resin on the substrate on which the color filter is formed.

15. The method of claim 12, further comprising hardening the black resin by applying at least one of UV radiation and heat thereto.

16. The method of claim 12, further comprising removing the at least one of the excess color inks and black resin from the clichés prior to transferring the color inks in the clichés onto the substrate.

17. The method of claim 16, further comprising moving a blade along the clichés such that the grooves are substantially filled by the at least one of the color inks and black resin to remove the at least one of the excess color inks and black resin, wherein the filled grooves are substantially planar with a remainder of the clichés, and the at least one of the color inks and black resin on the surface of the clichés not in the grooves are removed.

18. The method of claim 1, further comprising selecting red ink, green ink, and blue ink as the color inks.

19. The method of claim 1, further comprising removing at least one of excess color inks and black resin from the grooves in the clichés prior to transferring the color inks in the clichés onto the substrate.

20. The method of claim 1, further comprising transferring all of the color inks to the substrate on a single transfer apparatus.

21. The method of claim 20, further comprising disposing all of the color inks on the transfer apparatus at the same time.

22. The method of claim 1, further comprising supplying the color inks to the grooves.

23. The method of claim 22, wherein the supplying the color inks to the grooves comprises:
    providing a supplying container with at least one of the color inks;
    imparting the at least one of the color inks to an ink supplying roller from the supplying container;
    contacting the clichés with the ink supplying roller; and
    rolling the ink supplying roller on the clichés to apply the at least one of the color inks to the clichés.

24. The method of claim 23, further comprising:
    providing a plurality of ink supplying rollers; and
    imparting only one of the color inks to each ink supplying roller.

25. The method of claim 24, further comprising rolling each ink supplying roller on only one of the clichés.

26. A method of fabricating a color filter in a display device comprising:
    providing a plurality of clichés in which grooves are formed;
    supplying the clichés with color inks;
    rolling a first printing roller on a first cliché to transfer a first color ink in a groove of the first cliché onto a surface of the first printing roller;
    rolling the first printing roller on which the first color ink is transferred on a second cliché to transfer a second color ink in a groove of the second cliché onto the surface of the first printing roller;
    rolling the first printing roller on which the first and second color inks are transferred on a third cliché to transfer a third color ink in a groove of the third cliché onto the surface of the first printing roller;
    rolling the first printing roller on which the first, second, and third color inks are transferred on a substrate to apply the first, second, and third color inks to the substrate and form a color filter for a display device;
    supplying a black resin in a groove of a fourth cliché;
    rolling a second printing roller on the fourth cliché to transfer the black resin in the groove of the fourth cliché onto a surface of the second printing roller; and
    rolling the second printing roller containing the black resin on the color filter to apply the black resin transferred to the surface of the second printing roller onto boundary areas on top of the color inks forming the color filter.

27. A method of fabricating a color filter in a display device comprising:
    supplying grooves of a plurality of clichés with color inks;
    rolling the first printing roller on a first cliché to transfer a first color ink in a groove of the first cliché to a surface of the first printing roller;
    rolling the first printing roller containing the first color ink on a substrate to apply the first color ink to the substrate;
    rolling the first printing roller on a second cliché to transfer a second color ink in a groove of the second cliché to the surface of the first printing roller;
    rolling the first printing roller containing the second color ink on the substrate containing the first color ink to apply the second color ink to the substrate;
    rolling the first printing roller on a third cliché to transfer a third color ink in a groove of the third cliché to the surface of the first printing roller;
    rolling the first printing roller containing the third color ink on the substrate containing the first and second color inks to apply the third color ink to the substrate to form a color filter for a display device;

supplying a groove of a fourth cliché with black resin and rolling a second printing roller on the fourth cliché to transfer the black resin in the groove of the fourth cliché to a surface of the second printing roller; and rolling the second printing roller containing the black resin on the substrate to apply the black resin transferred to the surface of the second printing roller onto a boundary area on top of the first, second, and third colors on the substrate forming the color filter.

28. The method of claim 27, further comprising removing color ink present on the first printing roller from the first printing roller before a new color ink is transferred to the first printing roller.

* * * * *